US012769399B2

(12) United States Patent
Kito

(10) Patent No.: US 12,769,399 B2
(45) Date of Patent: Oct. 20, 2026

(54) PSEUDO-HAPTIC SENSATION GENERATION APPARATUS

(71) Applicant: Murata Manufacturing Co., Ltd., Nagaokakyo (JP)

(72) Inventor: Keito Kito, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 19/305,183

(22) Filed: Aug. 20, 2025

(65) Prior Publication Data

US 2025/0370543 A1 Dec. 4, 2025

Related U.S. Application Data

(63) Continuation of application No. PCT/JP2024/006167, filed on Feb. 21, 2024.

(30) Foreign Application Priority Data

Feb. 23, 2023 (JP) ................................. 2023-026793
Jul. 3, 2023 (JP) ................................. 2023-109167

(51) Int. Cl.
*G06F 3/01* (2006.01)

(52) U.S. Cl.
CPC .............. *G06F 3/016* (2013.01); *G06F 3/014* (2013.01)

(58) Field of Classification Search
CPC ............. G06F 3/01; G06F 3/014; G06F 3/016
See application file for complete search history.

(56) References Cited

U.S. PATENT DOCUMENTS

| | | | |
|---|---|---|---|
| 9,041,520 | B2 | 5/2015 | Nakamura et al. |
| 9,135,791 | B2 | 9/2015 | Nakamura et al. |
| 9,142,104 | B2 | 9/2015 | Nakamura et al. |
| 9,171,437 | B2 | 10/2015 | Nakamura et al. |
| 9,495,803 | B2 | 11/2016 | Nakamura et al. |
| 9,495,804 | B2 | 11/2016 | Nakamura et al. |

(Continued)

FOREIGN PATENT DOCUMENTS

| | | |
|---|---|---|
| JP | 2005-190465 A | 7/2005 |
| JP | 2017-073101 A | 4/2017 |

(Continued)

OTHER PUBLICATIONS

International Search Report received for PCT Patent Application No. PCT/JP2024/006167, mailed on May 7, 2024, 5 pages (English translation only).

*Primary Examiner* — Sanghyuk Park
(74) *Attorney, Agent, or Firm* — ArentFox Schiff LLP

(57) ABSTRACT

A pseudo-haptic sensation generation apparatus is provided that includes a first vibration generator, a second vibration generator, a first fitting device, and a second fitting device. The vibration generator is configured to generate a first vibration and a second vibration that each induce the pseudo-haptic sensation. The first fitting device is configured to fit the first vibration generator (21) to the index finger of a hand of a user. The second fitting device is configured to fit the second vibration generator to the little finger of the hand of the user. The first vibration generator, the first fitting device, the second fitting device, and the second vibration generator are arranged in this order in the row direction of fingers of the hand of the user.

25 Claims, 9 Drawing Sheets

(56) References Cited

U.S. PATENT DOCUMENTS

| | | | | |
|---|---|---|---|---|
| 10,082,875 | B1 | 9/2018 | Kim et al. | |
| 10,216,278 | B2 | 2/2019 | Nakamura et al. | |
| 10,488,928 | B2 | 11/2019 | Katsuki et al. | |
| 10,621,837 | B2 | 4/2020 | Tachi et al. | |
| 10,838,497 | B2 | 11/2020 | Nakamura et al. | |
| 11,100,772 | B2 | 8/2021 | Amemiya et al. | |
| 11,287,888 | B2 | 3/2022 | Nakamura et al. | |
| 11,287,892 | B2 | 3/2022 | Nakamura et al. | |
| 2007/0091063 | A1 | 4/2007 | Nakamura et al. | |
| 2011/0050404 | A1 | 3/2011 | Nakamura et al. | |
| 2013/0265148 | A1 | 10/2013 | Nakamura et al. | |
| 2013/0265149 | A1 | 10/2013 | Nakamura et al. | |
| 2013/0265254 | A1 | 10/2013 | Nakamura et al. | |
| 2015/0253854 | A1 | 9/2015 | Nakamura et al. | |
| 2015/0358543 | A1* | 12/2015 | Kord ....................... | G06F 3/014 345/474 |
| 2015/0371510 | A1 | 12/2015 | Nakamura et al. | |
| 2017/0031443 | A1 | 2/2017 | Nakamura et al. | |
| 2017/0168565 | A1* | 6/2017 | Cohen .................. | A61B 5/0022 |
| 2017/0220111 | A1 | 8/2017 | Nakamura et al. | |
| 2017/0262060 | A1 | 9/2017 | Katsuki et al. | |
| 2018/0196515 | A1* | 7/2018 | Appleyard .............. | G06F 3/016 |
| 2019/0043322 | A1 | 2/2019 | Tachi et al. | |
| 2019/0129506 | A1 | 5/2019 | Nakamura et al. | |
| 2021/0043051 | A1 | 2/2021 | Amemiya et al. | |
| 2021/0141457 | A1 | 5/2021 | Nakamura et al. | |

FOREIGN PATENT DOCUMENTS

| | | | |
|---|---|---|---|
| JP | 2019-139470 | A | 8/2019 |
| JP | 2019-191862 | A | 10/2019 |
| JP | 2020-102279 | A | 7/2020 |
| WO | 2016/088246 | A1 | 6/2016 |
| WO | 2017/175868 | A1 | 10/2017 |

* cited by examiner

| S1 \ S2 | S2F | S2B |
|---|---|---|
| S1F | FORWARD MOVEMENT | LEFT TURN |
| S1B | RIGHT TURN | BACKWARD MOVEMENT |

FIG. 9
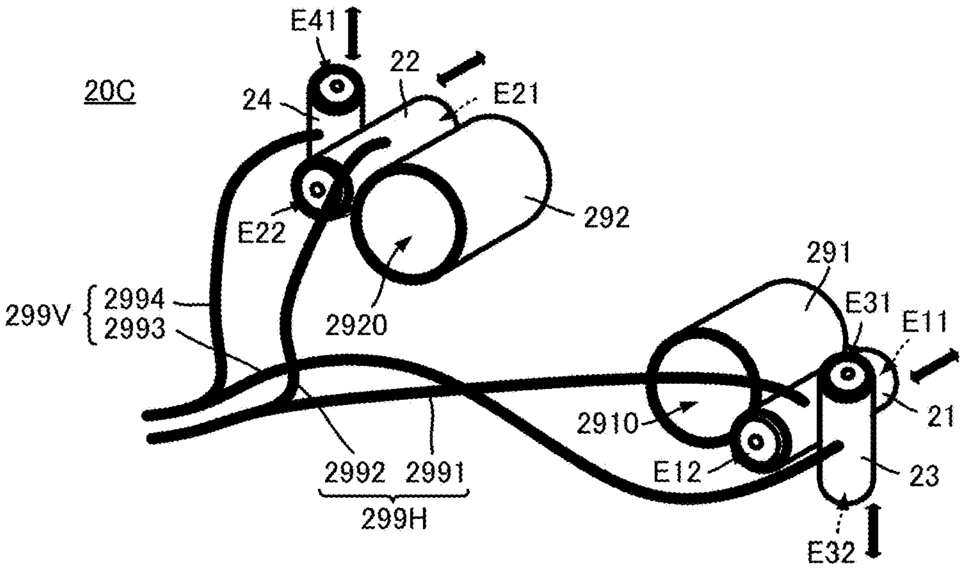
FIG. 10
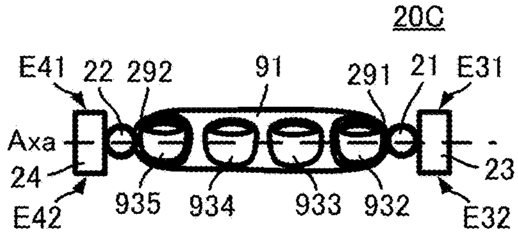
FIG. 11
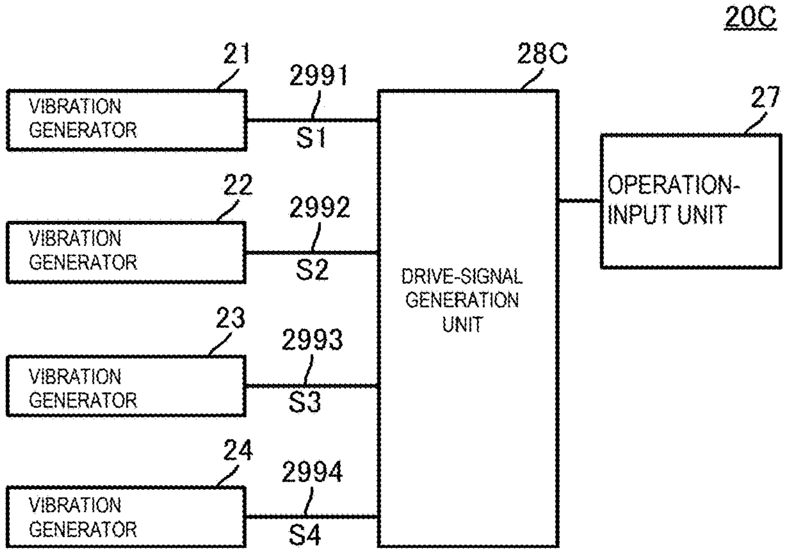
FIG. 12
| | S4F | S4B |
|---|---|---|
| S3F | — | COUNTERCLOCKWISE TWIST |
| S3B | CLOCKWISE TWIST | — |

PSEUDO-HAPTIC SENSATION GENERATION APPARATUS

CROSS REFERENCE TO RELATED APPLICATIONS

This application is a continuation of International Application No. PCT/JP2024/006167, filed Feb. 21, 2024, which claims priority to Japanese Patent Application No. Application No. 2023-026793, filed Feb. 23, 2023, and Japanese Patent Application No. 2023-109167, filed Jul. 3, 2023, the contents of each of which are hereby incorporated by reference in their entireties.

TECHNICAL FIELD

The present disclosure relates to a technique of providing a user with a haptic sensation that causes the user to have a haptic illusion (i.e., a pseudo-haptic sensation).

BACKGROUND

Currently, Japanese Unexamined Patent Application Publication No. 2020-102279 describes a haptic information presentation system. The haptic information presentation system described therein includes a housing that a user grips. The housing contains a vibration body. Part of the vibration body is exposed from the housing.

When the user touches the vibration body while gripping the housing, the user feels haptic sensation.

In order to use a known haptic information system, such as the one described above, it is necessary to grip the housing that generates the haptic sensation. This configuration may restrict the user's behavior. For example, the user cannot feel haptic sensations while the user touches other things by hand.

SUMMARY OF THE INVENTION

In view of the foregoing, it is an object of the present disclosure to provide a pseudo-haptic sensation generation apparatus that provides the user with pseudo-haptic sensations while also suppressing the restriction on the user's behavior.

According to an exemplary aspect, a pseudo-haptic sensation generation apparatus is provided that is configured to provide a pseudo-haptic sensation through a hand. In this aspect, the pseudo-haptic sensation generation apparatus includes a first vibration generator, a second vibration generator, a first fitting device, and a second fitting device. The first vibration generator is configured to generate first vibration that induces the pseudo-haptic sensation. The second vibration generator is configured to generate second vibration that induces the pseudo-haptic sensation. The first fitting device is configured to fit the first vibration generator to a first finger of the hand. The second fitting device is configured to fit the second vibration generator to a second finger of the hand.

Moreover, in the exemplary aspect, the first vibration generator, the first fitting device, the second fitting device, and the second vibration generator are arranged in this order in a row direction of fingers of the hand.

With this configuration, the first vibration generator and the second vibration generator that cause the pseudo-haptic sensation are configured to be fitted to the sides of a hand. This configuration increases the freedom of the hand use and also increases the distance between the first vibration generator and the second vibration generator, which can increase the pseudo-haptic sensation to be provided.

According to another exemplary aspect of the present disclosure, a pseudo-haptic sensation generation apparatus is provided that is configured to provide a pseudo-haptic sensation through a hand. In this aspect, the pseudo-haptic sensation generation apparatus includes a first vibration generator, a second vibration generator, a first fitting device, a second fitting device, and a drive-signal generation unit. The first vibration generator is configured to generate first vibration that induces the pseudo-haptic sensation. The second vibration generator is configured to generate second vibration that induces the pseudo-haptic sensation. The first fitting device is configured to fit the first vibration generator to a first finger of the hand. The second fitting device is configured to fit the second vibration generator to a second finger of the hand.

In this exemplary aspect, the drive-signal generation unit can be configured to generate a first drive signal for to cause the first vibration and a second drive signal to cause the second vibration. The drive-signal generation unit is configured to determine a combination of a wave form of the first drive signal and a wave form of the second drive signal in response to a type of the pseudo-haptic sensation.

With this configuration, the first vibration generator and the second vibration generator that cause the pseudo-haptic sensation can be fitted to the sides of a hand. This configuration increases the freedom of the hand use. In addition, the combination of the wave form of the first drive signal and the wave form of the second drive signal generates multiple types of the pseudo-haptic sensation.

According to the exemplary aspects of the present disclosure, the pseudo-haptic sensation generation apparatus provides the user with multiple types of pseudo-haptic sensation while also suppressing the restriction on the user's behavior.

BRIEF DESCRIPTION OF DRAWINGS

FIG. 9 is a perspective view illustrating the exterior of parts of a pseudo-haptic sensation generation apparatus according to a fourth exemplary embodiment, the parts configured to be put on a hand.

FIG. 10 is a front view illustrating the pseudo-haptic sensation generation apparatus of the fourth exemplary embodiment.

FIG. 11 is a functional block diagram of the pseudo-haptic sensation generation apparatus of the fourth exemplary embodiment.

FIG. 12 is a table illustrating an example relationship between types of pseudo-haptic sensation and combinations of a third drive signal S3 and a fourth drive signal S4.

DETAILED DESCRIPTION OF EMBODIMENTS

First Exemplary Embodiment

A pseudo-haptic sensation generation apparatus according to a first exemplary embodiment will be described with reference to the drawings.

(Mechanical Structure of Pseudo-Haptic Sensation Generation Apparatus 20)

Figure 1:
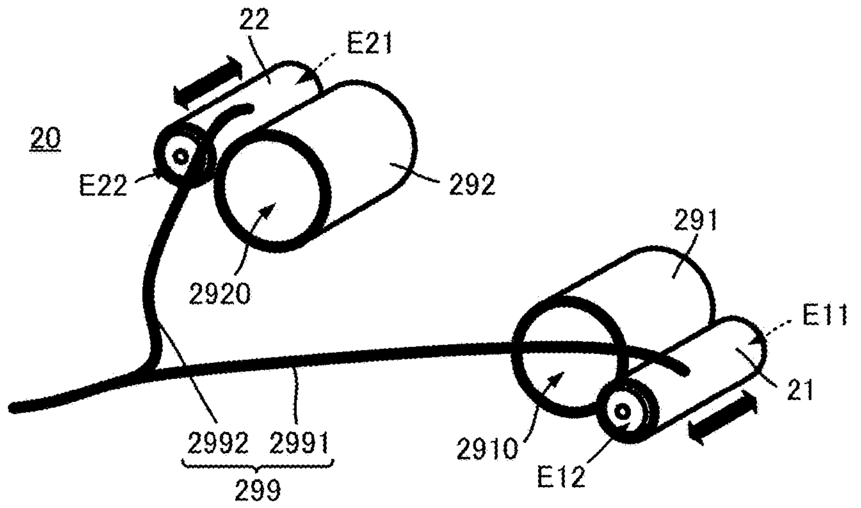
FIG. 1 is a perspective view illustrating the exterior of parts of a pseudo-haptic sensation generation apparatus according to a first exemplary embodiment, the parts configured to be put on a hand.

FIG. 1 is a perspective view illustrating the exterior of parts of the pseudo-haptic sensation generation apparatus according to the first exemplary embodiment, the parts configured to be put (e.g., worn) on a hand.

As illustrated in FIG. 1, a pseudo-haptic sensation generation apparatus 20 includes a vibration generator 21, a vibration generator 22, a fitting device 291, a fitting device 292, and a signal cable 299. The signal cable 299 includes a signal cable 2991 and a signal cable 2992.

As an exemplary aspect and for purposes of this disclosure, the vibration generator 21 can correspond to a "first vibration generator", and the vibration generator 22 can correspond to a "second vibration generator". Moreover, the fitting device 291 can correspond to a "first fitting device", and the fitting device 292 can correspond to a "second fitting device". Furthermore, the signal cable 2991 can correspond to a "first signal cable", and the signal cable 2992 can correspond to a "second signal cable".

The vibration generator 21 and the vibration generator 22 have similar structures.

The vibration generator 21 has a columnar external shape and has a first end portion E11 and a second end portion E12 at both ends in the extending direction of the column. The vibration generator 22 has a columnar external shape and has a first end portion E21 and a second end portion E22 at both ends in the extending direction of the column. It is noted that the external shape of the vibration generator 21 is not limited to a round column.

Schematically speaking, each of the vibration generator 21 and the vibration generator 22 includes a tubular housing, a magnet, a core, and a coil. The magnet, the core, and the coil are disposed inside the housing. The core is held in the housing so as to be configured to vibrate. The magnet is attached to the core. The coil is disposed, for example, at the inner wall surface of the housing so as to extend along the magnet.

As shown, the coil of the vibration generator 21 is connected to the signal cable 2991. The signal cable 2991 supplies a first drive signal S1 to the coil of the vibration generator 21. In the vibration generator 21, the first drive signal S1 vibrates a structure having the magnet and the core (i.e., a first vibration body) in a direction extending parallel to the longitudinal direction of the column between the first end portion E11 and the second end portion E12 (i.e., along an axis of first vibration). This configuration causes the housing of the vibration generator 21 to vibrate, thereby propagating vibrations to the outside.

Moreover, the coil of the vibration generator 22 is connected to the signal cable 2992. The signal cable 2992 supplies a second drive signal S2 to the coil of the vibration generator 22. In the vibration generator 22, the second drive signal S2 vibrates a structure having the magnet and the core (i.e., a second vibration body) in a direction extending parallel to the longitudinal direction of the column between the first end portion E21 and the second end portion E22 (i.e., along an axis of second vibration). This configuration causes the housing of the vibration generator 22 to vibrate, thereby propagating vibrations to the outside.

The fitting device 291 and the fitting device 292 have similar structures. The fitting device 291 and the fitting device 292 are made of a material that can transmit vibrations.

The fitting device 291 has a tubular body with a through-hole 2910. The fitting device 292 has a tubular body with a through-hole 2920. The through-hole 2910 and the through-hole 2920 are sized such that a finger can pass therethrough.

The vibration generator 21 is fixed to the outer circumferential surface of the fitting device 291. The extending direction of the columnar vibration generator 21 (e.g., the axis of first vibration) is parallel to the extending direction of the tubular body of the fitting device 291.

The vibration generator 22 is fixed to the outer circumferential surface of the fitting device 292. The extending direction of the columnar vibration generator 22 (e.g., the axis of second vibration) is parallel to the extending direction of the tubular body of the fitting device 292.

It is noted that the term "parallel" used above does not necessarily indicate the perfect parallelism but may allow for fixation error within such a range as to be configured to induce pseudo-haptic sensation (to be described later).

(Wearing Mode of Pseudo-Haptic Sensation Generation Apparatus 20)

Figure 2:
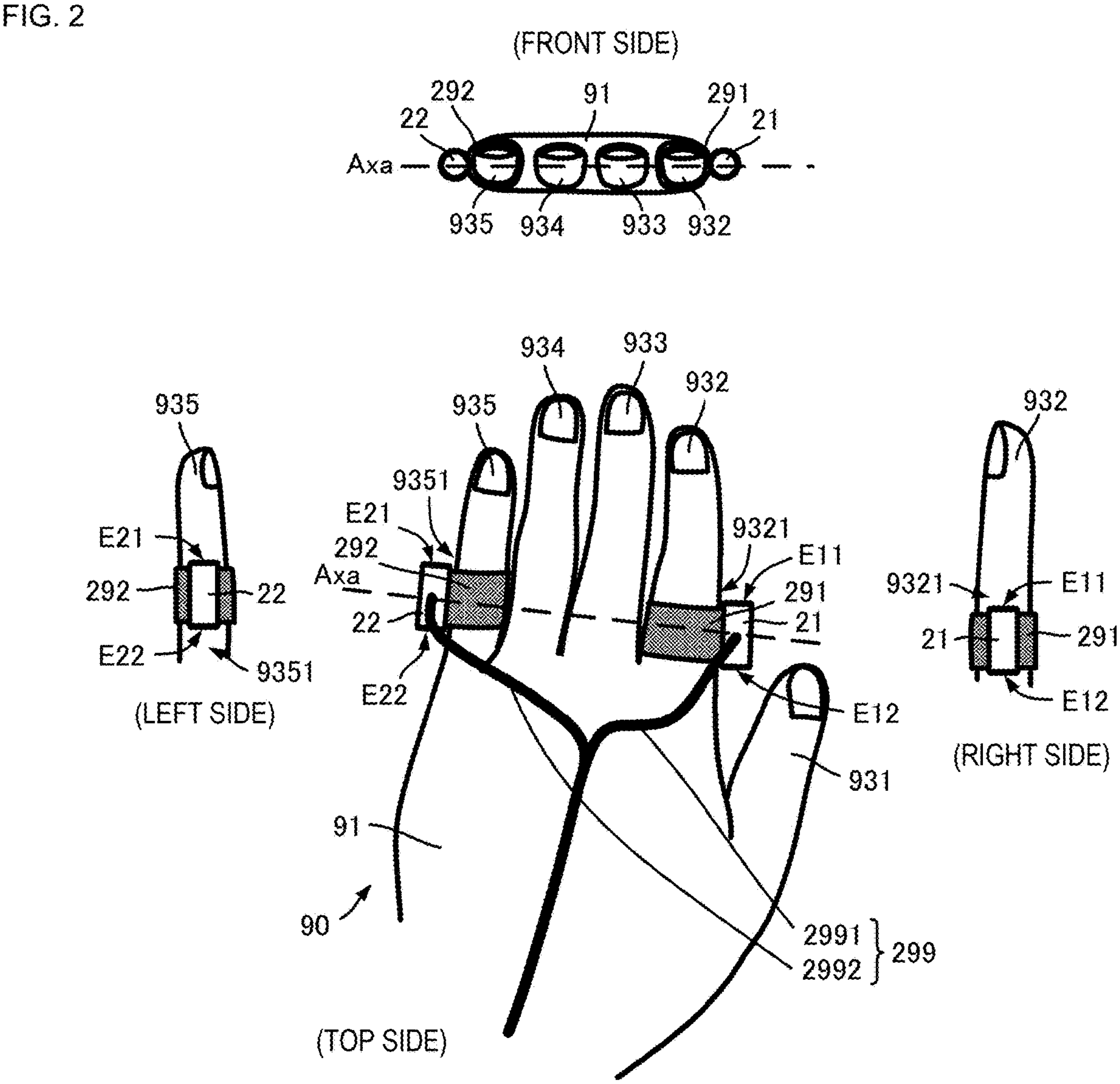
FIG. 2 is a four-side view illustrating a state in which the pseudo-haptic sensation generation apparatus of the first exemplary embodiment is worn on the hand.

FIG. 2 is a four-side view illustrating a state in which the pseudo-haptic sensation generation apparatus of the first embodiment is worn on a hand. FIG. 2 illustrates a case in which the pseudo-haptic sensation generation apparatus is worn on the left hand. FIG. 2 includes a top view in which the back of the hand is viewed, a right-side view in which the index finger is viewed, a left-side view in which the little finger is viewed, and a front view in which the tips of fingers are viewed.

As illustrated in FIG. 2, the fitting device 291 is worn on an index finger 932 of a hand 90. For purposes of this disclosure and according to an exemplary aspect, the index finger 932 can correspond, for example, to a "first finger". In other words, the index finger 932 is inserted through the through-hole 2910 of the fitting device 291. The inner surface of the fitting device 291 is pressed against the index finger 932 at a predetermined pressure. A face of the fitting device 291, which extends perpendicular to the direction of the index finger 932 being inserted into the fitting device 291 (i.e., the opening face of the through-hole 2910), is referred to as a fitting-side face of the fitting device 291.

In this state, the vibration generator 21 is positioned at a side 9321 of the index finger 932. More specifically, the vibration generator 21 is positioned at the side 9321 of the index finger 932, the side 9321 facing opposite to a middle finger 933.

The fitting device 292 is worn on a little finger 935 of the hand 90. For purposes of this disclosure and according to an exemplary aspect, the little finger 935 can correspond, for example, to a "second finger". In other words, the little finger 935 is inserted through the through-hole 2920 of the fitting device 292. The inner surface of the fitting device 292 is pressed against the little finger 935 at a predetermined pressure. A face of the fitting device 292, which extends perpendicular to the direction of the little finger 935 being inserted into the fitting device 292 (i.e., the opening face of the through-hole 2920), is referred to as a fitting-side face of the fitting device 292.

In this state, the vibration generator 22 is positioned at a side 9351 of the little finger 935. More specifically, the vibration generator 22 is positioned at the side 9351 of the little finger 935, the side 9351 facing opposite to a third finger 934.

According to this configuration, a user to whom a pseudo-haptic sensation is given can wear the vibration generator 21 and the vibration generator 22 without the necessity of gripping devices by the user's entire hand. The pseudo-haptic sensation generation apparatus 20 can thereby be configured to provide the user with pseudo-haptic sensations without reducing user's freedom of hand use.

According to the above configuration, the vibration generator 21, the fitting device 291, the fitting device 292, and the vibration generator 22 are arranged in this order from the index finger 932 to the little finger 935 along an axis (i.e., dotted line Axa in the drawing) drawn parallel to the row direction of the fingers. In other words, the vibration generator 21 and the vibration generator 22 are disposed at the opposite ends of the hand 90 with the fitting device 291 and the fitting device 292 being interposed therebetween.

Accordingly, the vibration generator 21 and the vibration generator 22 are disposed substantially at the opposite ends of the hand 90 with a thumb 931 excluded. This configuration further suppresses the reduction of the user's freedom of hand use. Consequently, the pseudo-haptic sensation generation apparatus 20 can be configured to provide the user with multiple types of pseudo-haptic sensation without suppressing the restriction on the user's behavior.

In addition, the vibration generator 21 and the vibration generator 22 are spaced by the width of the hand 90 with the thumb 931 excluded. In other words, the vibration generator 21 and the vibration generator 22 are spaced as much as possible within the size of the hand 90 of the user. This configuration can efficiently provide the user with a pseudo-haptic sensation of turning, which will be described later.

The vibration generator 21 is disposed such that the first end portion E11 comes closer to the tip of the index finger 932 and the second end portion E12 comes closer to the base of the index finger 932 (i.e., closer to a back 91 of the hand). The vibration generator 22 is disposed such that the first end portion E21 comes closer to the tip of the little finger 935 and the second end portion E22 comes closer to the base of the little finger 935 (i.e., closer to the back 91 of the hand). In order to facilitate the user to wear the device in this mode (in this mode of arrangement of parts), marks or indications can be provided that indicate the insertion direction on the vibration generator 21, the vibration generator 22, the fitting device 291, and the fitting device 292.

The positional relationship between both ends of the vibration generator 21 and both ends of the vibration generator 22 in the longitudinal direction of finger can be adjusted by changing the way of providing the first drive signal S1 and the second drive signal S2. It becomes easier, however, to control the first drive signal S1 and the second drive signal S2 in such a case that the end positions of the vibration generator 21 and the vibration generator 22 in the longitudinal direction of finger are fixed in advance.

For example, the signal cable 2991 and the signal cable 2992 extend along the back 91 of the hand. At least one of the extension length and the extension shape of the signal cable 2991 and the signal cable 2992 may be fixed or may be semifixed. In this case, the positional relationship of the vibration generator 21, the fitting device 291, the fitting device 292, and the vibration generator 22 can be fixed in some degree before the pseudo-haptic sensation generation apparatus 20 is worn on the hand 90.

(Electrical Function of Pseudo-Haptic Sensation Generation Apparatus 20)

Figures 3, 4:
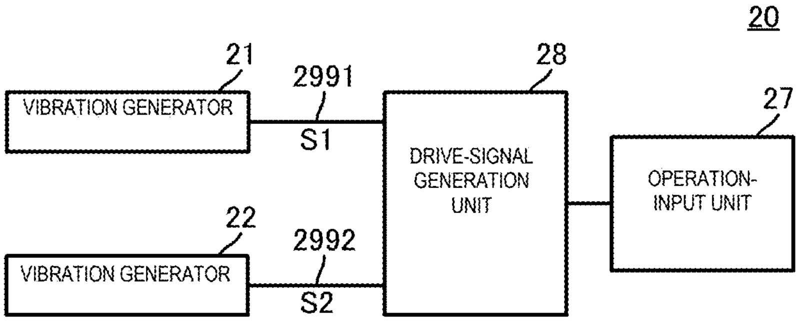
FIG. 3 is a functional block diagram of the pseudo-haptic sensation generation apparatus of the first exemplary embodiment.
FIG. 4 is a table illustrating an example relationship between types of pseudo-haptic sensation and combinations of a first drive signal S1 and a second drive signal S2.

FIG. 3 is a functional block diagram of the pseudo-haptic sensation generation apparatus of the first embodiment.

As illustrated in FIG. 3, the pseudo-haptic sensation generation apparatus 20 includes the vibration generator 21, the vibration generator 22, an operation-input unit 27, a drive-signal generation unit 28, the signal cable 2991, and the signal cable 2992.

The vibration generator 21 is connected to the drive-signal generation unit 28 via the signal cable 2991. The vibration generator 22 is connected to the drive-signal generation unit 28 via the signal cable 2992. The drive-signal generation unit 28 is connected to the operation-input unit 27.

The operation-input unit 27 receives an input for selecting a type of pseudo-haptic sensation to be provided to the user. The operation-input unit 27 outputs the type of the pseudo-haptic sensation to the drive-signal generation unit 28.

The drive-signal generation unit 28 can be configured to generate the first drive signal S1 and the second drive signal S2 in response to the type of pseudo-haptic sensation. The first drive signal S1 and the second drive signal S2 are adjusted, in terms of wave form, frequency, amplitude, or the like, depending on the type of pseudo-haptic sensation.

The drive-signal generation unit 28 supplies the first drive signal S1 to the vibration generator 21 via the signal cable 2991. The drive-signal generation unit 28 supplies the second drive signal S2 to the vibration generator 22 via the signal cable 2992. Here, it is preferable that the drive-signal generation unit 28 supply (e.g., output) the first drive signal S1 and the second drive signal S2 in synchronization with each other.

In response to the first drive signal S1, the vibration generator 21 can be configured to generate vibrations (e.g., a first vibration) along the axis of first vibration. The first vibration propagates to the index finger 932 through the fitting device 291. The pseudo-haptic sensation generation apparatus 20 uses the first vibration to cause the index finger 932 to feel a first haptic sensation.

In response to the second drive signal S2, the vibration generator 22 can be configured to generate vibrations (e.g., a second vibration) along the axis of second vibration. The second vibration propagates to the little finger 935 through the fitting device 292. The pseudo-haptic sensation generation apparatus 20 uses the second vibration to cause the little finger 935 to feel a second haptic sensation.

The pseudo-haptic sensation generation apparatus 20 can be configured to provide the user with various types of pseudo-haptic sensation as described below by combining the first haptic sensation and the second haptic sensation.

Figure 5A:
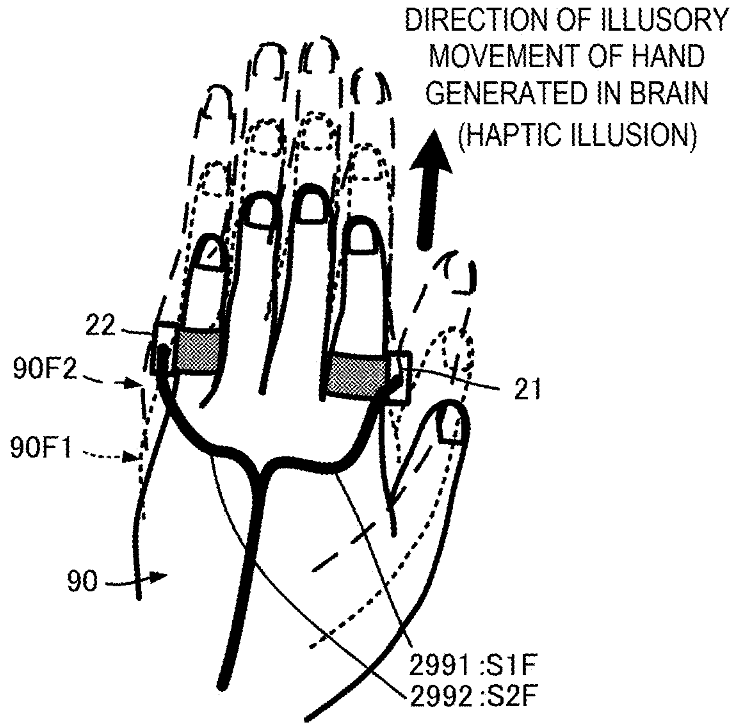
FIG. 5(A) is a conceptual illustration of a pseudo-haptic sensation of forward movement of the hand.
Figure 5B:
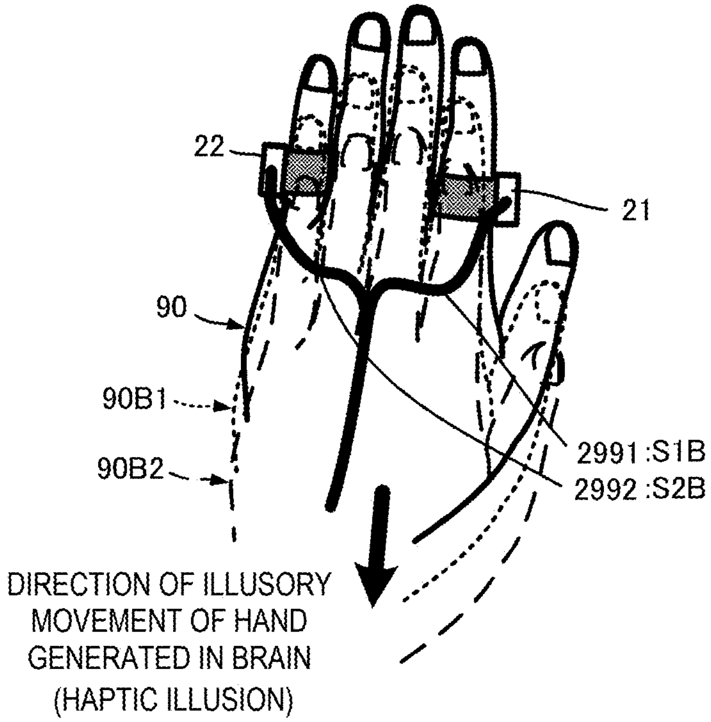
FIG. 5(B) is a conceptual illustration of a pseudo-haptic sensation of backward movement of the hand.
Figure 6A:
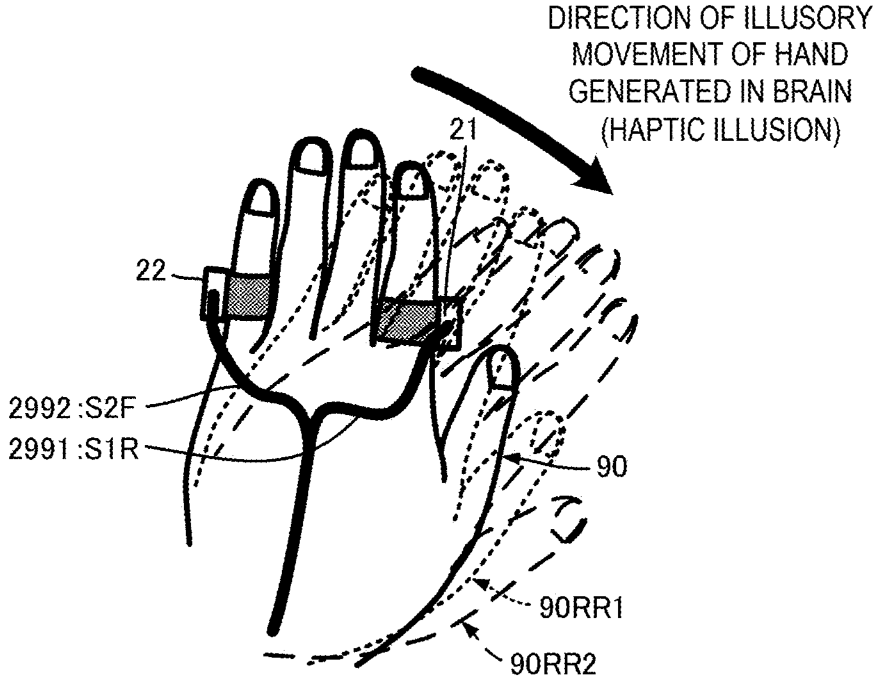
FIG. 6(A) is a conceptual illustration of a pseudo-haptic sensation of right turn of the hand.
Figure 6B:
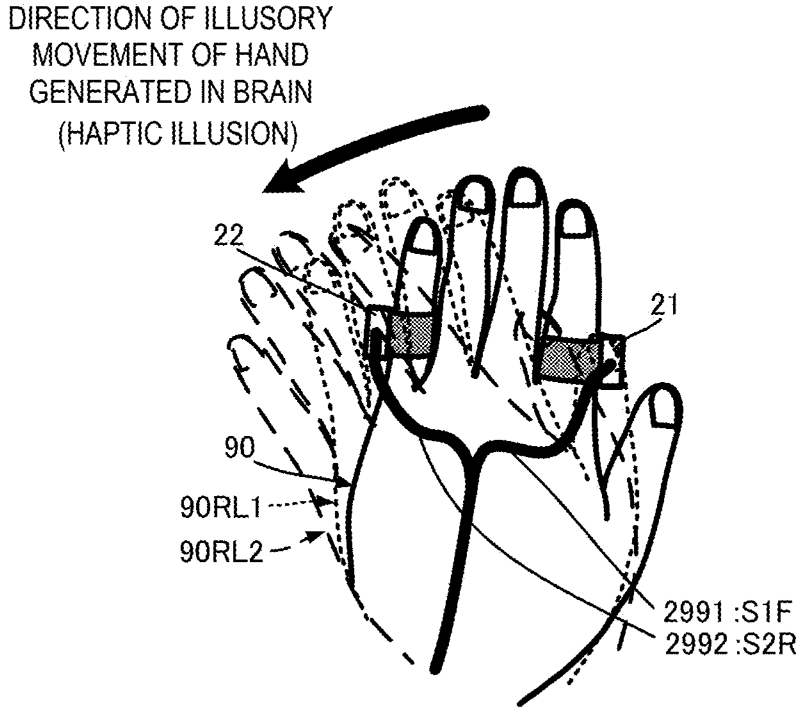
FIG. 6(B) is a conceptual illustration of a pseudo-haptic sensation of left turn of the hand.

FIG. 4 is a table illustrating an example relationship between the types of pseudo-haptic sensation and the combinations of the first drive signal S1 and the second drive signal S2. FIG. 5(A) is a conceptual illustration of a pseudo-haptic sensation of forward movement of the hand, and FIG. 5(B) is a conceptual illustration of a pseudo-haptic sensation of backward movement of the hand. FIG. 6(A) is a conceptual illustration of a pseudo-haptic sensation of right turn of the hand, and FIG. 6(B) is a conceptual illustration of a pseudo-haptic sensation of left turn of the hand.

As illustrated in FIG. 5(A), the pseudo-haptic sensation of forward movement of the hand is a pseudo-haptic sensation that creates an illusion in the user's brain to feel as if the hand 90 moved toward the tips of the fingers even though the user does not move the hand 90 in reality.

As illustrated in FIG. 5(B), the pseudo-haptic sensation of backward movement of the hand is a pseudo-haptic sensation that creates an illusion in the user's brain to feel as if the hand 90 moved toward the wrist (e.g., toward the bases of the fingers) even though the user does not move the hand 90 in reality.

As illustrated in FIG. 6(A), the pseudo-haptic sensation of right turn of the hand is a pseudo-haptic sensation that creates an illusion in the user's brain to feel as if the hand 90 made a right turn even though the user does not move the hand 90 in reality. For example, the hand 90 is the left hand as in the case of FIG. 6(A), and accordingly the pseudo-haptic sensation creates an illusion that the hand 90 turns in a direction toward the thumb.

As illustrated in FIG. 6(B), the pseudo-haptic sensation of left turn of the hand is a pseudo-haptic sensation that creates an illusion in the user's brain to feel as if the hand 90 made a left turn even though the user does not move the hand 90 in reality. For example, the hand 90 is the left hand as in the case of FIG. 6(B), and accordingly the pseudo-haptic sensation creates an illusion that the hand 90 turns in a direction toward the little finger.

(Forward Movement)

As indicated in FIG. 4, in the case of providing the pseudo-haptic sensation of forward movement of the hand, the drive-signal generation unit 28 selects a first drive signal S1F and a second drive signal S2F. The first drive signal S1F is a signal that generates vibrations that cause the user to feel as if the body part in contact with the vibration generator 21 (i.e., the index finger 932) moved from the second end portion E12 toward the first end portion E11 of the vibration generator 21. The second drive signal S2F is a signal that generates vibrations that cause the user to feel as if the body part in contact with the vibration generator 22 (i.e., the little finger 935) moved from the second end portion E22 toward the first end portion E21 of the vibration generator 22.

In this case, the index finger 932 and the little finger 935 feel a sensation of force as if the hand 90 moved forward. Accordingly, the hand 90 feels a combined sensation of forces that move the hand 90 forward, which causes the user to feel a haptic illusion as if the hand 90 moved forward as indicated with the hand 90, a hand 90F1, and a hand 90F2 in FIG. 5(A).

(Backward Movement

As indicated in FIG. 4, in the case of providing the pseudo-haptic sensation of backward movement of the hand, the drive-signal generation unit 28 selects a first drive signal S1B and a second drive signal S2B. The first drive signal S1B is a signal that generates vibrations that cause the user to feel as if the body part in contact with the vibration generator 21 (i.e., the index finger 932) moved from the first end portion E11 toward the second end portion E12 of the vibration generator 21. The second drive signal S2B is a signal that generates vibrations that cause the user to feel as if the body part in contact with the vibration generator 22 (i.e., the little finger 935) moved from the first end portion E21 toward the second end portion E22 of the vibration generator 22.

In this case, the index finger 932 and the little finger 935 feel a sensation of force as if the hand 90 moved backward. Accordingly, the hand 90 feels a combined sensation of forces that move the hand 90 backward, which causes the user to feel a haptic illusion as if the hand 90 moved backward as indicated with the hand 90, a hand 90B1, and a hand 90B2 in FIG. 5(B).

(Right Turn)

As indicated in FIG. 4, in the case of providing the pseudo-haptic sensation of right turn of the hand, the drive-signal generation unit 28 selects the first drive signal S1B and the second drive signal S2F.

In this case, the pseudo-haptic sensation generation apparatus 20 can be configured to provide the index finger 932 with a sensation of force so as to feel as if the hand 90 moved backward and also provide the little finger 935 with a sensation of force so as to feel as if the hand 90 moved forward. Accordingly, the hand 90 feels a combined sensation of forces that move the index finger 932 backward and also move the little finger 935 forward, which causes the user to feel a haptic illusion as if the hand 90 made a right turn as indicated with the hand 90, a hand 90RR1, and a hand 90RR2 in FIG. 6(A).

(Left Turn)

As indicated in FIG. 4, in the case of providing the pseudo-haptic sensation of left turn of the hand, the drive-signal generation unit 28 selects the first drive signal S1F and the second drive signal S2B.

In this case, the pseudo-haptic sensation generation apparatus 20 can be configured to provide the index finger 932 with a sensation of force so as to feel as if the hand 90 moved forward and also provide the little finger 935 with a sensation of force so as to feel as if the hand 90 moved backward. Accordingly, the hand 90 feels a combined sensation of forces that move the index finger 932 forward and also move the little finger 935 backward, which causes the user to feel a haptic illusion as if the hand 90 made a left turn as indicated with the hand 90, a hand 90RL1, and a hand 90RL2 in FIG. 6(B).

As described above, the pseudo-haptic sensation generation apparatus 20 can be configured to provide the user with multiple types of pseudo-haptic sensation by combining the first drive signal S1 and the second drive signal S2.

Because the vibration generator 21 and the vibration generator 22 are spaced in the width direction of the hand 90 (along the axis Axe), the pseudo-haptic sensation generation apparatus 20 can provide the user with large pseudo-haptic sensations efficiently without unnecessarily intensifying the vibrations of the vibration generator 21 and the vibration generator 22. In particular, the pseudo-haptic sensation generation apparatus 20 can provide the user with pseudo-haptic sensations of turning efficiently.

Second Exemplary Embodiment

Figure 7:
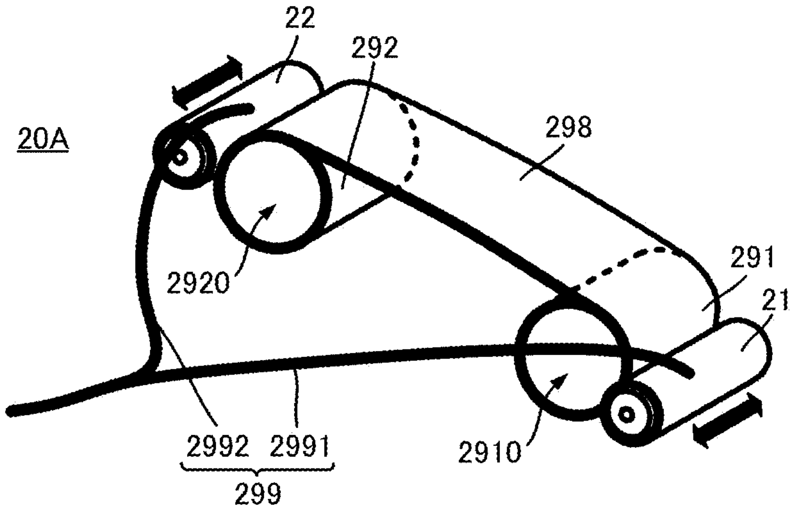
FIG. 7 is a perspective view illustrating the exterior of parts of a pseudo-haptic sensation generation apparatus according to a second exemplary embodiment, the parts configured to be put on a hand.

A pseudo-haptic sensation generation apparatus according to a second exemplary embodiment will be described with reference to the drawings. FIG. 7 is a perspective view illustrating the exterior of parts of the pseudo-haptic sensation generation apparatus of the second embodiment, the parts configured to be put on a hand.

As illustrated in FIG. 7, a pseudo-haptic sensation generation apparatus 20A of the second embodiment further includes a connection member 298, which is different from the pseudo-haptic sensation generation apparatus 20 of the first embodiment. It is noted that other configurations of the pseudo-haptic sensation generation apparatus 20A are similar to those of the pseudo-haptic sensation generation apparatus 20, and the description of the similar configurations will be omitted.

The pseudo-haptic sensation generation apparatus 20A includes the connection member 298. The connection member 298 connects the fitting device 291 and the fitting device 292 to each other.

For example, the connection member 298 is a flat membrane. It is preferable that the connection member 298 have flexibility and elasticity.

The connection member 298 is preferably sized such that the distance between the end connected to the fitting device 291 and the end connected to the fitting device 292 is approximately equal to the width of the hand 90.

With this configuration, the user can wear the pseudo-haptic sensation generation apparatus 20A more easily and more securely while the pseudo-haptic sensation generation apparatus 20A provides advantageous effects similar to those of the pseudo-haptic sensation generation apparatus 20.

It is noted that when worn, the connection member 298 preferably comes to the side of the back 91 of the hand. Accordingly, a mark or an indication can be provided, for example, to instruct that the connection member 298 comes to the back 91 of the hand.

Third Exemplary Embodiment

Figure 8A:
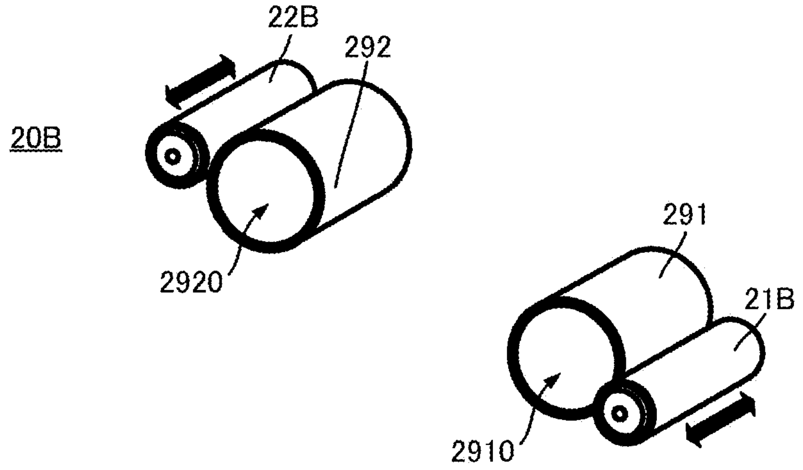
FIG. 8(A) is a perspective view illustrating the exterior of parts of a pseudo-haptic sensation generation apparatus according to a third exemplary embodiment, the parts configured to be put on a hand.
Figure 8B:
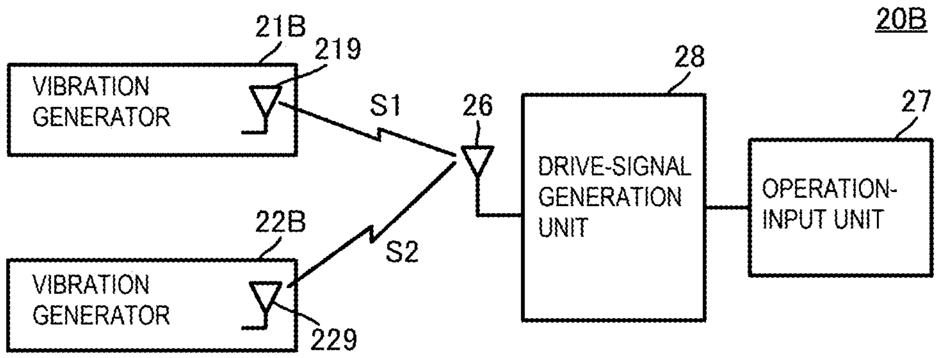
FIG. 8(B) is a functional block diagram of the pseudo-haptic sensation generation apparatus of the third exemplary embodiment.
Figure 8C:
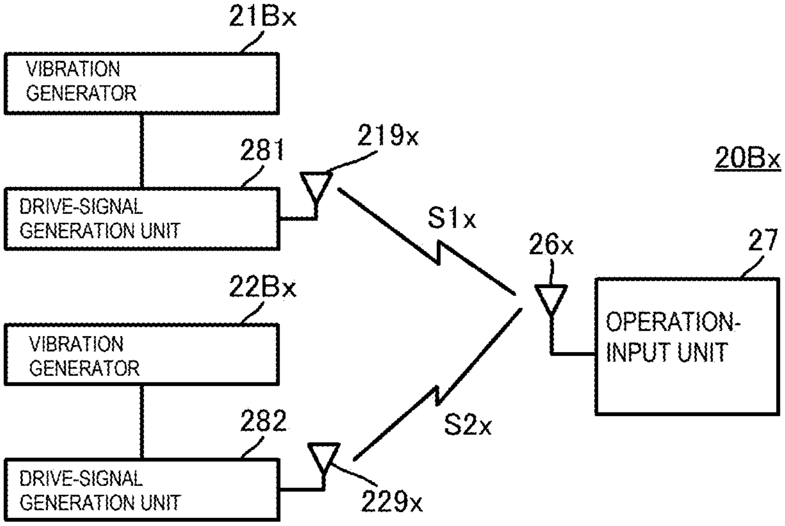
FIG. 8(C) is a functional block diagram of an example apparatus derived from the pseudo-haptic sensation generation apparatus of the third exemplary embodiment.

A pseudo-haptic sensation generation apparatus according to a third exemplary embodiment will be described with reference to the drawings. FIG. 8(A) is a perspective view illustrating the exterior of parts of a pseudo-haptic sensation generation apparatus according to the third embodiment, the parts configured to be put on a hand. FIG. 8(B) is a functional block diagram of the pseudo-haptic sensation generation apparatus of the third embodiment, and FIG. 8(C) is a functional block diagram of an example apparatus derived from the pseudo-haptic sensation generation apparatus of the third embodiment.

As illustrated in FIGS. 8(A) and 8(B), a pseudo-haptic sensation generation apparatus 20B of the third embodiment is different from the pseudo-haptic sensation generation apparatus 20 of the first embodiment in that the first drive signal S1 and the second drive signal S2 are transmitted in wireless communication. It is noted that other configurations of the pseudo-haptic sensation generation apparatus 20B are similar to those of the pseudo-haptic sensation generation apparatus 20, and the description of the similar configurations will be omitted.

As illustrated in FIG. 8(A), the pseudo-haptic sensation generation apparatus 20B includes a vibration generator 21B, a vibration generator 22B, and an antenna 26. The vibration generator 21B includes the structure of the vibration generator 21 and an antenna 219. The antenna 219 is connected to the coil of the vibration generator 21B. The vibration generator 22B includes the structure of the vibration generator 22 and an antenna 229. The antenna 229 is connected to the coil of the vibration generator 22B.

The drive-signal generation unit 28 is connected to the antenna 26. The antenna 26 can communicate wirelessly with the antenna 219 and the antenna 229.

With this configuration, the pseudo-haptic sensation generation apparatus 20B can further be configured to suppress the reduction of the freedom of hand while providing advantageous effects similar to those of the pseudo-haptic sensation generation apparatus 20.

In addition, a pseudo-haptic sensation generation apparatus 20Bx as illustrated in FIG. 8(C) includes a vibration generator 21Bx, a vibration generator 22Bx, a drive-signal generation unit 281, a drive-signal generation unit 282, the operation-input unit 27, an antenna 26*x*, an antenna 219*x*, and an antenna 229*x*.

For example, the vibration generator 21Bx and the drive-signal generation unit 281 are connected to each other by a cable. For example, the vibration generator 22Bx and the drive-signal generation unit 282 are connected to each other by a cable. It is noted that the cable connection can be replaced with wireless connection.

The antenna 219*x* is connected to the drive-signal generation unit 281. The antenna 229*x* is connected to the drive-signal generation unit 282. The antenna 26*x* is connected to the operation-input unit 27.

The operation-input unit 27 transmits a signal S1*x*, which indicates a type of pseudo-haptic sensation received, to the drive-signal generation unit 281 via the antenna 26*x* and the antenna 219*x*. The operation-input unit 27 transmits a signal S2*x*, which indicates the type of the pseudo-haptic sensation received, to the drive-signal generation unit 282 via the antenna 26*x* and the antenna 229*x*.

In response to the signal S1*x* received, the drive-signal generation unit 281 can be configured to generate the first drive signal S1 and outputs it to the vibration generator 21Bx. In response to the signal S2*x* received, the drive-signal generation unit 282 can be configured to generate the second drive signal S2 and outputs it to the vibration generator 22Bx.

With this configuration, the pseudo-haptic sensation generation apparatus 20Bx can provide advantageous effects similar to those of the pseudo-haptic sensation generation apparatus 20B.

Fourth Exemplary Embodiment

A pseudo-haptic sensation generation apparatus according to a fourth exemplary embodiment will be described with reference to the drawings. FIG. 9 is a perspective view illustrating the exterior of parts of a pseudo-haptic sensation generation apparatus of the fourth embodiment, the parts configured to be put on a hand. FIG. 10 is a front view illustrating the pseudo-haptic sensation generation apparatus of the fourth embodiment. FIG. 11 is a functional block diagram of the pseudo-haptic sensation generation apparatus of the fourth embodiment.

As illustrated in FIGS. 9, 10, and 11, a pseudo-haptic sensation generation apparatus 20C of the fourth embodiment generates vibrations along axes that orthogonally intersect each other, as opposed to the pseudo-haptic sensation generation apparatus 20 of the first embodiment that generates uniaxial vibrations.

(Mechanical Structure of Pseudo-Haptic Sensation Generation Apparatus 20C)

As illustrated in FIGS. 9 and 10, the pseudo-haptic sensation generation apparatus 20C further includes, as the parts worn on the hand, a vibration generator 23, a vibration generator 24, and a signal cable 299V in addition to those parts included in the pseudo-haptic sensation generation apparatus 20. It is noted that a signal cable 299H illustrated in FIGS. 9 and 10 is the same as the signal cable 299 of the first embodiment.

The vibration generator 23 and the vibration generator 24 are configured similarly to the vibration generator 21 and the vibration generator 22. The vibration generator 23 has a first end portion E31 and a second end portion E32. The vibration generator 24 has a first end portion E41 and a second end portion E42. For purposes of the present disclosure and according to an exemplary aspect, the vibration generator 23 can correspond to a "third vibration generator", and the vibration generator 24 can correspond to a "fourth vibration generator".

The vibration generator 23, together with the vibration generator 21, is fitted to the fitting device 291. More specifically, the vibration generator 21 is fitted to the fitting device 291, and the vibration generator 23 is connected physically to the vibration generator 21.

The extending direction of the columnar vibration generator 23 (i.e., the direction from the first end portion E31 to the second end portion E32) orthogonally intersects the extending direction of the columnar vibration generator 21 (i.e., the direction from the first end portion E11 to the second end portion E12).

It is noted that the "orthogonal intersection" as above is not limited to perfectly orthogonal intersection. For example, the "orthogonal intersection" as above allows for an error (fitting error) within such a range as to be configured to induce pseudo-haptic sensation (to be described later).

Accordingly, the vibration direction of the vibration generator 23 (i.e., the axis of third vibration) orthogonally intersects the vibration direction of the vibration generator 21 (i.e., the axis of first vibration) and the row direction of the fingers (i.e., the axis Axa).

The vibration generator 24, together with the vibration generator 22, is fitted to the fitting device 292. More specifically, the vibration generator 22 is fitted to the fitting device 292, and the vibration generator 24 is connected physically to the vibration generator 22.

The extending direction of the columnar vibration generator 24 (i.e., the direction from the first end portion E41 to the second end portion E42) orthogonally intersects the extending direction of the columnar vibration generator 22 (i.e., the direction from the first end portion E21 to the second end portion E22).

It is noted that the "orthogonal intersection" as above is not limited to perfectly orthogonal intersection. For example, the "orthogonal intersection" as above allows for an error (fitting error) within such a range as to be configured to induce pseudo-haptic sensation (to be described later).

Accordingly, the vibration direction of the vibration generator 24 (i.e., the axis of fourth vibration) orthogonally intersects the vibration direction of the vibration generator 22 (i.e., the axis of second vibration) and the row direction of the fingers (i.e., the axis Axa).

The signal cable 299V includes a signal cable 2993 and a signal cable 2994. The signal cable 2993 is connected to the vibration generator 23, and the signal cable 2994 is connected to the vibration generator 24. The signal cable 2993 and the signal cable 2994 extend along the back 91 of the hand together with the signal cable 2991 and the signal cable 2992.

(Electrical Function of Pseudo-Haptic Sensation Generation Apparatus 20C)

As illustrated in FIG. 11, the pseudo-haptic sensation generation apparatus 20C further includes the vibration generator 23, the vibration generator 24, the signal cable 2993, and the signal cable 2994 in addition to the elements of the pseudo-haptic sensation generation apparatus 20 in order to implement electrical functions. The pseudo-haptic sensation generation apparatus 20C also includes a drive-signal generation unit 28C. The drive-signal generation unit 28C can further generate a third drive signal S3 and a fourth drive signal S4, which is different from the drive-signal generation unit 28 of the pseudo-haptic sensation generation apparatus 20.

The vibration generator 23 is connected to the drive-signal generation unit 28C via the signal cable 2993. The vibration generator 24 is connected to the drive-signal generation unit 28C via the signal cable 2994.

The drive-signal generation unit 28C can be configured to generate the third drive signal S3 and the fourth drive signal S4 in response to the type of pseudo-haptic sensation. The third drive signal S3 and the fourth drive signal S4 are adjusted, in terms of wave form, frequency, amplitude, or the like, depending on the type of pseudo-haptic sensation.

The drive-signal generation unit 28C supplies the third drive signal S3 to the vibration generator 23 via the signal cable 2993. The drive-signal generation unit 28C supplies the fourth drive signal S4 to the vibration generator 24 via the signal cable 2994. Here, it is preferable that the drive-signal generation unit 28C supply (output) the third drive signal S3 and the fourth drive signal S4 in synchronization with each other.

In response to the third drive signal S3, the vibration generator 23 can be configured to generate vibrations (e.g., a third vibration) along the axis of third vibration. The third vibration propagates to the index finger 932 through the fitting device 291. The pseudo-haptic sensation generation apparatus 20C uses the third vibration to cause the index finger 932 to feel a third haptic sensation.

In response to the fourth drive signal S4, the vibration generator 24 can be configured to generate vibrations (e.g., a fourth vibration) along the axis of fourth vibration. The fourth vibration propagates to the little finger 935 through the fitting device 292. The pseudo-haptic sensation generation apparatus 20C uses the fourth vibration to cause the little finger 935 to feel a fourth haptic sensation.

The pseudo-haptic sensation generation apparatus 20C can be configured to provide the user with various types of pseudo-haptic sensation as described below by combining the third haptic sensation and the fourth haptic sensation.

Figure 13A:
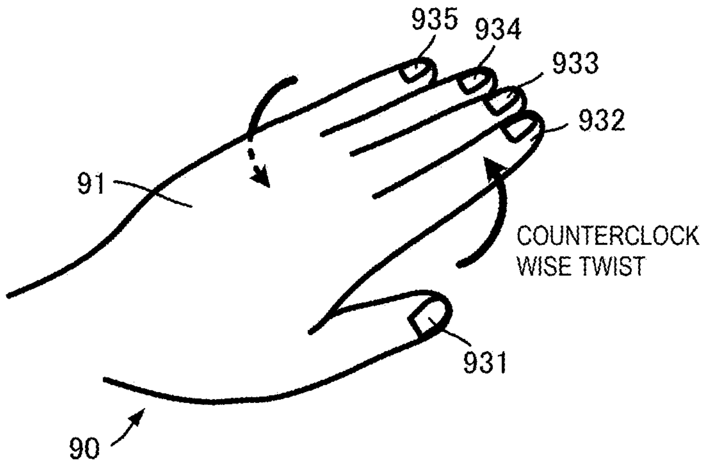
FIG. 13(A) is a conceptual illustration of a pseudo-haptic sensation of counterclockwise twist of the hand.

FIG. 12 is a table illustrating an example relationship between the types of pseudo-haptic sensation and the combinations of the third drive signal S3 and the fourth drive signal S4. FIG. 13(A) is a conceptual illustration of a pseudo-haptic sensation of counterclockwise twist of the hand, and FIG. 13(B) is a conceptual illustration of a pseudo-haptic sensation of clockwise twist of the hand.

As illustrated in FIG. 13(A), the pseudo-haptic sensation of counterclockwise twist of the hand is a pseudo-haptic sensation that creates an illusion in the user's brain to feel as if the user twisted the hand 90 counterclockwise (i.e., the hand rotates such that the thumb 931 comes to the side of the back 91 of the hand while the little finger 935 comes to the palm side of the hand) even though the user does not move the hand 90 in reality.

Figure 13B:
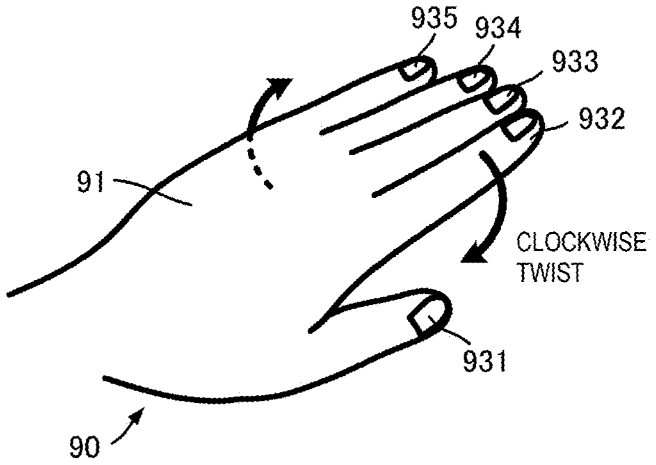
FIG. 13(B) is a conceptual illustration of a pseudo-haptic sensation of clockwise twist of the hand.

As illustrated in FIG. 13(B), the pseudo-haptic sensation of clockwise twist of the hand is a pseudo-haptic sensation that creates an illusion in the user's brain to feel as if the user twisted the hand 90 clockwise (i.e., the hand rotates such that the thumb 931 comes to the palm side of the hand while the little finger 935 comes to the side of the back 91 of the hand) even though the user does not move the hand 90 in reality.

(Counterclockwise Twist)

In the case of providing the pseudo-haptic sensation of counterclockwise twist of the hand, the drive-signal generation unit 28C selects a third drive signal S3F and a fourth drive signal S4B. The third drive signal S3F is a signal that generates vibrations that cause the user to feel as if the body part in contact with the vibration generator 23 (i.e., the index finger 932) moved from the second end portion E32 toward the first end portion E31 of the vibration generator 23. The fourth drive signal S4B is a signal that generates vibrations that cause the user to feel as if the body part in contact with the vibration generator 24 (i.e., the little finger 935) moved from the first end portion E41 toward the second end portion E42 of the vibration generator 24.

(Clockwise Twist)

In the case of providing the pseudo-haptic sensation of clockwise twist of the hand, the drive-signal generation unit 28C selects a third drive signal S3B and a fourth drive signal S4F. The third drive signal S3B is a signal that generates vibrations that cause the user to feel as if the body part in contact with the vibration generator 23 (i.e., the index finger 932) moved from the first end portion E31 toward the second end portion E32 of the vibration generator 23. The fourth drive signal S4F is a signal that generates vibrations that cause the user to feel as if the body part in contact with the vibration generator 24 (i.e., the little finger 935) moved from the second end portion E42 toward the first end portion E41 of the vibration generator 24.

With the above configuration, the pseudo-haptic sensation generation apparatus 20C can be configured to provide the user with such an illusion that the user twists the hand 90 in addition to such illusions that the user moves the hand 90 back and forth and turns the hand 90 to the right or to the left.

Example Derived from Fourth Embodiment

Figure 14:
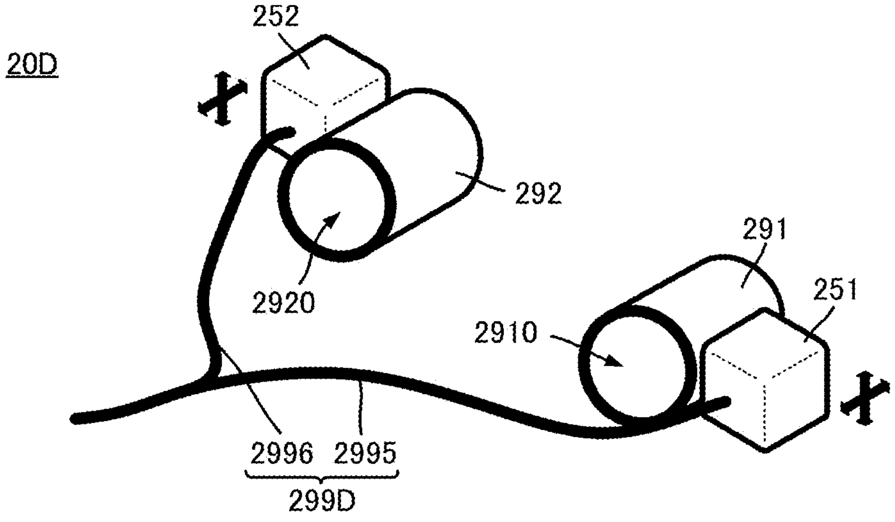
FIG. 14 is a perspective view illustrating the exterior of parts of an example apparatus derived from the pseudo-haptic sensation generation apparatus of the fourth exemplary embodiment, the parts configured to be put on a hand.

FIG. 14 is a perspective view illustrating the exterior of parts of an example apparatus derived from the pseudo-haptic sensation generation apparatus of the fourth embodiment, the parts configured to be put on a hand. As illustrated in FIG. 14, a pseudo-haptic sensation generation apparatus 20D of the derived example further includes a vibration generator 251, a vibration generator 252, and a signal cable 299D, which is different from the pseudo-haptic sensation generation apparatus 20C of the fourth embodiment.

The vibration generator 251 is shaped like a housing (e.g., a first housing) that contains therein the first vibration body of the vibration generator 21 and the third vibration body of the vibration generator 23 of the pseudo-haptic sensation generation apparatus 20C.

The vibration generator 252 is shaped like a housing (e.g., a second housing) that contains therein the second vibration body of the vibration generator 22 and the fourth vibration body of the vibration generator 24 of the pseudo-haptic sensation generation apparatus 20C.

The vibration generator 251 is fitted to the fitting device 291. The vibration generator 252 is fitted to the fitting device 292.

The signal cable 299D includes a signal cable 2995 and a signal cable 2996. The signal cable 2995 is a cable in which the signal cable 2991 and the signal cable 2993 of the pseudo-haptic sensation generation apparatus 20C are bundled. The signal cable 2996 is a cable in which the signal cable 2992 and the signal cable 2994 of the pseudo-haptic sensation generation apparatus 20C are bundled.

The signal cable 2995 is connected to the vibration generator 251 and also to the drive-signal generation unit 28C (of which the illustration is omitted). The signal cable 2996 is connected to the vibration generator 252 and also to the drive-signal generation unit 28C (of which the illustration is omitted).

With this configuration, the pseudo-haptic sensation generation apparatus 20D can provide advantageous effects similar to those of the pseudo-haptic sensation generation apparatus 20C.

(Various Modes of Fitting Device)

FIG. 15(A), FIG. 15(B), FIG. 15(C), FIG. 15(D), FIG. 15(E), FIG. 15(F), and FIG. 15(G) are front views illustrating respective pseudo-haptic sensation generation apparatuses that include different fitting devices. Note that these are merely examples. It is noted that other variations may be applicable insofar as the vibration generator 21 and the vibration generator 22 propagate vibrations to the hand so as to induce the above haptic illusion while suppressing the reduction of the freedom of the hand. A pseudo-haptic sensation generation apparatus 20X1 illustrated in FIG. 15(A) includes a fitting device 291X1 and a fitting device 292X1. The fitting device 291X1 and the fitting device 292X1 have tubular bodies with flexibility and elasticity.

Figure 15A:
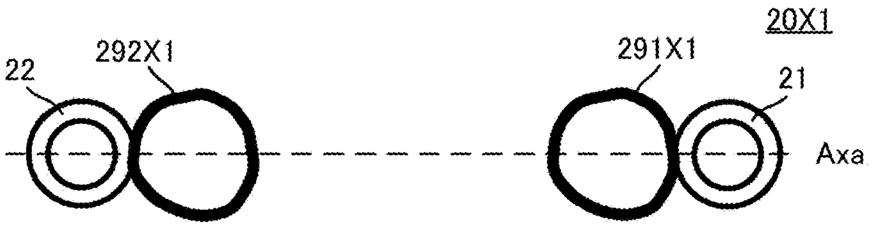
FIG. 15(A), FIG. 15(B), FIG. 15(C), FIG. 15(D), FIG. 15(E), FIG. 15(F), and FIG. 15(G) are front views illustrating respective pseudo-haptic sensation generation apparatuses that include different fitting devices.
Figure 15B:
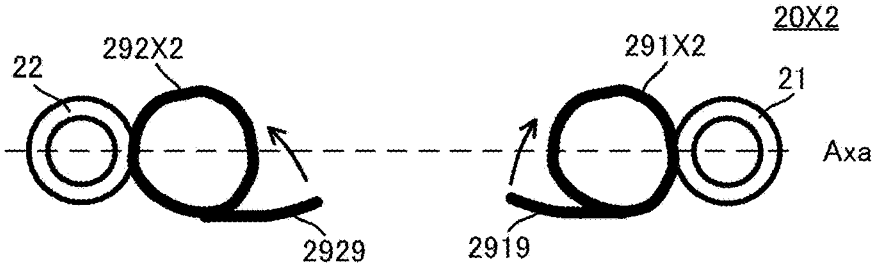

A pseudo-haptic sensation generation apparatus 20X2 illustrated in FIG. 15(B) includes a fitting device 291X2 and a fitting device 292X2. The fitting device 291X2 and the fitting device 292X2 have tubular bodies with flexibility and elasticity. The fitting device 291X2 includes an adjustment member 2919 having a tongue-like shape. For purposes of the present disclosure and according to an exemplary aspect, the adjustment member 2919 can correspond to a "first adjustment member". The adjustment member 2919 can be wound around the outer circumferential surface of the tubular body. In the pseudo-haptic sensation generation apparatus 20X2, the fitting strength of the fitting device 291X2 around the index finger 932 can be adjusted by adjusting the state of the adjustment member 2919 being wound around the tubular body. The fitting device 292X2 includes an adjustment member 2929 having a tongue-like shape. Moreover, the adjustment member 2929 can correspond to a "second adjustment member". The adjustment member 2929 can be wound around the outer circumferential surface of the tubular body. In the pseudo-haptic sensation generation apparatus 20X2, the fitting strength of the fitting device 292X2 around the little finger 935 can be adjusted by adjusting the state of the adjustment member 2929 being wound around the tubular body.

Figure 15C:
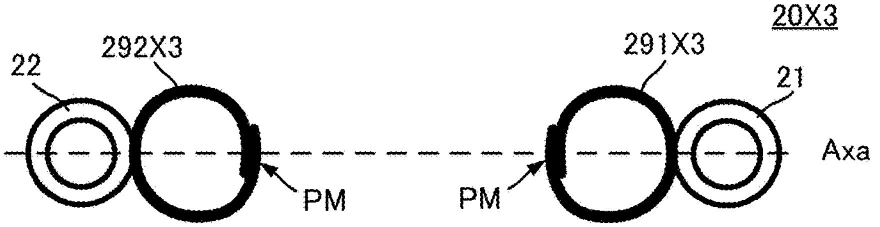

A pseudo-haptic sensation generation apparatus 20X3 illustrated in FIG. 15(C) includes a fitting device 291X3 and a fitting device 292X3. The fitting device 291X3 and the fitting device 292X3 are flat membranes having flexibility and preferably having elasticity. The fitting device 291X3 is wound around the index finger 932. The fitting device 291X3 has portions that overlap each other when wound around and has a fixation device disposed at the overlapping portions. The fitting device 292X3 is wound around the little finger 935. The fitting device 292X3 has portions that overlap each other when wound around and has a fixation device disposed at the overlapping portions.

Figure 15D:
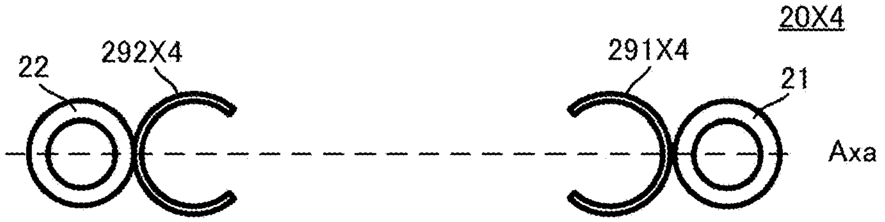

A pseudo-haptic sensation generation apparatus 20X4 illustrated in FIG. 15(D) includes a fitting device 291X4 and a fitting device 292X4. The fitting device 291X4 and the fitting device 292X4 each have a tubular body shaped like a circular pipe with the wall of the tube being cut off partially in the circumferential direction.

Figure 15E:

A pseudo-haptic sensation generation apparatus 20X5 illustrated in FIG. 15(E) includes a fitting device 291X5 and a fitting device 292X5. The fitting device 291X5 and the fitting device 292X5 each have a tubular body shaped like a rectangular pipe with the wall of the tube being cut off partially in the circumferential direction.

Figure 15F:
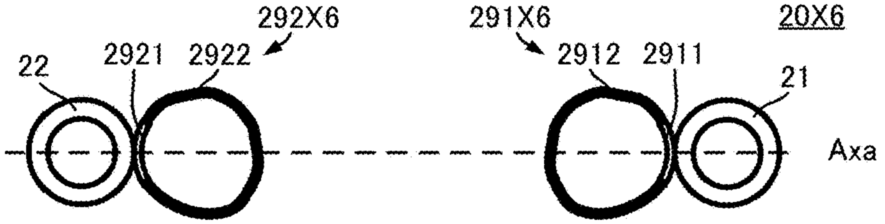

A pseudo-haptic sensation generation apparatus 20X6 illustrated in FIG. 15(F) includes a fitting device 291X6 and a fitting device 292X6. The fitting device 291X6 includes a fixation portion 2911 and a shape-deformable portion 2912. The fixation portion 2911 and the shape-deformable portion 2912 are connected to each other so as to form a single tubular body. The fixation portion 2911 is made of such a material that exhibits a high transmission efficiency of vibration. The vibration generator 21 is fixed to the fixation portion 2911. The shape-deformable portion 2912 is made of a material with flexibility and elasticity. The fitting device 292X6 includes a fixation portion 2921 and a shape-deformable portion 2922. The fixation portion 2921 and the shape-deformable portion 2922 are connected to each other so as to form a single tubular body. The fixation portion 2921 is made of such a material that exhibits a high transmission efficiency of vibration. The vibration generator 22 is fixed to the fixation portion 2921. The shape-deformable portion 2922 is made of a material with flexibility and elasticity.

Figure 15G:
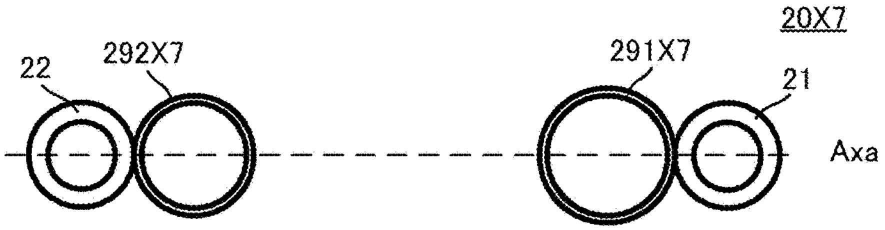

A pseudo-haptic sensation generation apparatus 20X7 illustrated in FIG. 15(G) includes a fitting device 291X7 and a fitting device 292X7. The fitting device 291X7 and the fitting device 292X7 are made of a material, such as a metal or a resin having a low flexibility, that can transmit vibrations highly efficiently. The fitting device 291X7 and the fitting device 292X7 are different in the size of through-hole. More specifically, the fitting device 291X7 and the fitting device 292X7 are each shaped so as to fit the shape of the finger to be fitted around. In this example, the fitting device 291X7 is formed so as to fit the shape of the index finger 932, and the fitting device 292X7 is formed so as to fit the shape of the little finger 935.

In general, in the above exemplary embodiments, the vibration generators have been described as the ones generating uniaxial or biaxial vibrations. However, the configurations described above can be applied to vibration generators that generate triaxial vibrations as would be appreciated to one skilled in the art.

In the above embodiments, the vibration generators are fitted around the index finger and the little finger. The vibration generators, however, may be fitted around two different fingers, which can provide similar advantageous effects as would be appreciated to one skilled in the art. It is preferable, however, that the vibration generators be fitted around the index finger and the little finger and not around the thumb.

The above embodiments and derived examples can be combined with one another appropriately, and resulted combinations can provide advantageous effects accordingly.

REFERENCE SIGNS LIST

20, 20A, 20B, 20C, 20D, 20Bx, 20X1, 20X2, 20X3, 20X4, 20X5, 20X6, 20X7 pseudo-haptic sensation generation apparatus
21, 21B, 21Bx, 22, 22B, 22Bx, 23, 24, 251, 252 vibration generator
26, 26*x* antenna
27 operation-input unit
28, 28C, 281, 282 drive-signal generation unit
219, 219*x*, 229, 229*x* antenna
291, 291X1, 291X2, 291X3, 291X4, 291X5, 291X6, 291X7, 292, 292X1, 292X2, 292X3, 292X4, 292X5, 292X6, 292X7 fitting device
298 connection member
299, 299D, 299H, 299V, 2991, 2992, 2993, 2994, 2995, 2996 signal cable
2910, 2920 through-hole
2919, 2929 adjustment member
2911, 2921 fixation portion
2912, 2922 shape-deformable portion
90, 90B1, 90B2, 90F1, 90F2, 90RL1, 90RL2, 90RR1, 90RR2 hand
91 back (of hand)
931 thumb
932 index finger
933 middle finger
934 third finger
935 little finger
9321, 9351 side
E11 first end portion
E12 second end portion
E21 first end portion
E22 second end portion
E31 first end portion
E32 second end portion
E41 first end portion
E42 second end portion
S1, S1B, S1F first drive signal
S2, S2B, S2F second drive signal
S3, S3B, S3F third drive signal
S4, S4B, S4F fourth drive signal

The invention claimed is:

1. A pseudo-haptic sensation generation apparatus for providing a pseudo-haptic sensation, the pseudo-haptic sensation generation apparatus comprising:
- a first vibration generator configured to generate a first vibration that induces the pseudo-haptic sensation;
- a second vibration generator configured to generate a second vibration that induces the pseudo-haptic sensation;
- a first fitting device configured to fit the first vibration generator to a first finger of a hand of a user; and
- a second fitting device configured to fit the second vibration generator to a second finger of the hand,
- wherein the first vibration generator, the first fitting device, the second fitting device, and the second vibration generator are arranged in this order in a row direction that corresponds to fingers of the hand.

2. The pseudo-haptic sensation generation apparatus according to claim 1, wherein the first vibration generator and the second vibration generator are arrayed to extend parallel to each other.

3. The pseudo-haptic sensation generation apparatus according to claim 1, wherein a direction normal to a fitting-side face of the first fitting device is parallel to a direction normal to a fitting-side face of the second fitting device.

4. The pseudo-haptic sensation generation apparatus according to claim 1, wherein:
- the first vibration generator includes a first vibration body, and the second vibration generator includes a second vibration body that extends in a direction parallel to the first vibration body.

5. The pseudo-haptic sensation generation apparatus according to claim 1, wherein:

an axis of the first vibration extends parallel to a longitudinal direction of the first finger, and an axis of the second vibration extends parallel to a longitudinal direction of the second finger.

6. The pseudo-haptic sensation generation apparatus according to claim 1, further comprising:

a first signal cable connected to the first vibration generator and configured to transmit a first drive signal that causes the first vibration; and a second signal cable connected to the second vibration generator and configured to transmit a second drive signal that causes the second vibration, wherein a length of the first signal cable and a length of the second signal cable are based on a distance between the first vibration generator and the second vibration generator.

7. The pseudo-haptic sensation generation apparatus according to claim 1, wherein the first fitting device and the second fitting device each have flexible tubular bodies.

8. The pseudo-haptic sensation generation apparatus according to claim 1, wherein:

the first fitting device includes a first adjustment member configured to adjust fitting strength of the first fitting device to the first finger, and the second fitting device includes a second adjustment member configured to adjust fitting strength of the second fitting device to the second finger.

9. The pseudo-haptic sensation generation apparatus according to claim 1, wherein the first fitting device is fitted to an index finger of the hand, and the second fitting device is fitted to a little finger of the hand.

10. The pseudo-haptic sensation generation apparatus according to claim 1, further comprising a connection member that joins the first fitting device to the second fitting device.

11. The pseudo-haptic sensation generation apparatus according to claim 1, further comprising:

a third vibration generator configured to generate a third vibration that induces the pseudo-haptic sensation; and a fourth vibration generator configured to generate a fourth vibration that induces the pseudo-haptic sensation, wherein:

the third vibration generator is fitted to the first fitting device, the fourth vibration generator is fitted to the second fitting device, an axis of vibration of the third vibration generator orthogonally intersects an axis of vibration of the first vibration generator, and an axis of vibration of the fourth vibration generator orthogonally intersects an axis of vibration of the second vibration generator.

12. The pseudo-haptic sensation generation apparatus according to claim 11, wherein:

the axis of vibration of the third vibration generator orthogonally intersects a longitudinal direction of the first finger, and the axis of vibration of the fourth vibration generator orthogonally intersects a longitudinal direction of the second finger.

13. The pseudo-haptic sensation generation apparatus according to claim 11, wherein:

the first vibration generator and the third vibration generator are separate members that are connected physically to each other, and the second vibration generator and the fourth vibration generator are separate members that are connected physically to each other.

14. The pseudo-haptic sensation generation apparatus according to claim 11, wherein:

the first vibration body of the first vibration generator and a third vibration body of the third vibration generator are both contained in a first housing, and the second vibration body of the second vibration generator and a fourth vibration body of the fourth vibration generator are both contained in a second housing.

15. A pseudo-haptic sensation generation apparatus for providing a pseudo-haptic sensation through a hand, the pseudo-haptic sensation generation apparatus comprising:

a first vibration generator configured to generate a first vibration that induces the pseudo-haptic sensation;

a second vibration generator configured to generate a second vibration that induces the pseudo-haptic sensation;

a first fitting device configured to fit the first vibration generator to a first finger of the hand;

a second fitting device configured to fit the second vibration generator to a second finger of the hand; and a drive-signal generation unit configured to generate a first drive signal to generate the first vibration and a second drive signal to generate the second vibration, wherein the drive-signal generation unit is configured to determine a combination of a wave form of the first drive signal and a wave form of the second drive signal in response to a type of the pseudo-haptic sensation.

16. The pseudo-haptic sensation generation apparatus according to claim 15, wherein the first vibration generator and the second vibration generator extend in a direction parallel to each other.

17. The pseudo-haptic sensation generation apparatus according to claim 15, wherein a direction normal to a fitting-side face of the first fitting device is parallel to a direction normal to a fitting-side face of the second fitting device.

18. The pseudo-haptic sensation generation apparatus according to claim 15, wherein:

the first vibration generator includes a first vibration body, and the second vibration generator includes a second vibration body that extends in a direction parallel to the first vibration body.

19. The pseudo-haptic sensation generation apparatus according to claim 15, wherein:

an axis of the first vibration extends parallel to a longitudinal direction of the first finger, and an axis of the second vibration extends parallel to a longitudinal direction of the second finger.

20. The pseudo-haptic sensation generation apparatus according to claim 15, wherein the drive-signal generation unit is configured to generate a signal of a first wave form as the first drive signal and as the second drive signal, the signal of the first wave form inducing a first pseudo-haptic sensation of the hand moving toward tips of fingers.

21. The pseudo-haptic sensation generation apparatus according to claim 15, wherein the drive-signal generation unit is configured to generate a signal of a second wave form as the first drive signal and as the second drive signal, the signal of the second wave form inducing a second pseudo-haptic sensation of the hand moving toward a wrist.

22. The pseudo-haptic sensation generation apparatus according to claim 15, wherein:

the drive-signal generation unit is configured to generate the signal of the first wave form as the first drive signal, the signal of the first wave form inducing the first pseudo-haptic sensation of the hand moving toward tips of the fingers, and the drive-signal generation unit is configured to generate the signal of the second wave form as the second drive signal, the signal of the second wave form inducing the second pseudo-haptic sensation of the hand moving toward a wrist.

23. The pseudo-haptic sensation generation apparatus according to claim 15, wherein:

the drive-signal generation unit is configured to generate the signal of the second wave form as the first drive signal, the signal of the second wave form inducing the second pseudo-haptic sensation of the hand moving toward a wrist, and the drive-signal generation unit is configured to generate the signal of the first wave form as the second drive signal, the signal of the first wave form inducing the first pseudo-haptic sensation of the hand moving toward tips of the fingers.

24. The pseudo-haptic sensation generation apparatus according to claim 15, further comprising:

a third vibration generator configured to generate a third vibration that induces the pseudo-haptic sensation, the third vibration generator being fitted to the first fitting device together with the first vibration generator; and a fourth vibration generator configured to generate a fourth vibration that induces the pseudo-haptic sensation, the fourth vibration generator being fitted to the second fitting device together with the second vibration generator, wherein:

the drive-signal generation unit is configured to generate a third drive signal for causing the third vibration and a fourth drive signal for causing the fourth vibration, and the drive-signal generation unit is configured to determine a combination of a wave form of the third drive signal and a wave form of the fourth drive signal in response to a type of the pseudo-haptic sensation.

25. The pseudo-haptic sensation generation apparatus according to claim 24, wherein:

the drive-signal generation unit is configured to generate a signal of a wave form as the third drive signal, the signal of the wave form inducing a pseudo-haptic sensation of moving toward a back of the hand or of moving toward a palm of the hand, the drive-signal generation unit is configured to generate a signal of the wave form as the fourth drive signal, the signal of the wave form inducing the pseudo-haptic sensation of moving toward the back of the hand or of moving toward the palm of the hand, and the wave forms of the third drive signal and the fourth drive signal are a combination of wave forms that induces pseudo-haptic sensations of moving in an opposite direction.

* * * * *